(12) United States Patent
Laughlin

(10) Patent No.: US 6,253,007 B1
(45) Date of Patent: *Jun. 26, 2001

(54) METHOD AND APPARATUS FOR CONNECTING OPTICAL FIBERS

(75) Inventor: Richard H. Laughlin, Richardson, TX (US)

(73) Assignee: Optical Switch Corporation, Richardson, TX (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/111,570

(22) Filed: Jul. 8, 1998

(51) Int. Cl.[7] .................................................... G02B 6/321
(52) U.S. Cl. ............................... 385/34; 385/33; 385/47
(58) Field of Search ................................ 385/24, 31, 32, 385/33, 34, 35, 47, 48; 359/652, 653, 654

(56) References Cited

U.S. PATENT DOCUMENTS

| Re. 29,194 | 4/1977 | Ambrose et al. ................. 355/43 |
|---|---|---|
| 1,967,548 | 7/1934 | Bartels ................................. 240/1 |
| 2,565,514 | 8/1951 | Pajes ..................................... 88/61 |

FOREIGN PATENT DOCUMENTS

| 3214042 A1 | 10/1983 | (DE) . |
|---|---|---|
| 2816645A5 | 8/1990 | (DE) . |
| 0347563A2 | 12/1989 | (EP) . |
| 0 360 686 A2 | 3/1990 | (EP) . |
| 0 674 198 A1 | 9/1995 | (EP) . |
| 2 438 850 | 9/1980 | (FR) . |
| 55-035347 | 3/1980 | (JP) . |
| 58-134613 | 8/1983 | (JP) . |
| 59-034507 | 2/1984 | (JP) . |
| 60-121405 | 6/1985 | (JP) . |
| 02116815 | 5/1990 | (JP) . |
| WO 96/02861 | 2/1996 | (WO) . |

OTHER PUBLICATIONS

PCT Search Report in International Application No. PCT/US 99/15326, dated Nov. 5, 1999, 8 pages.
PCT Search Report in International Application No. PCT/US 99/15433, dated Nov. 15, 1999, 8 pages.
PCT Search Report in International Application No. PCT/US 99/15327, dated Oct. 27, 1999, 7 pages.
"Astarte," Fiber Networks, Inc. (4 pages), No date.
"Piezoelectrically Driven Tip/Tilt Platforms," Physik Instruments (6 pages), No date.
"SiTek Electro Optics," On–Trak Photonics, Inc. (6 pages), No date.
Court, et al., "Frustrated Total Internal Reflection and Application of Its Principle to Laser Cavity Deisgn," Jun. 1964/vol. 3, No. 6/Applied Optics pp. 719–726.
"SELFOc®Product Guide," NSG America, Inc., Dec., 1996, 26 pages.
Dale Murray, et al., "Scalable Optical Switch Using Rotating Refractive Plates," *AMP Incorporated*, 10 pages, presented at the National Fiber Optics Engineers Conference, Sep., 1998.

(List continued on next page.)

Primary Examiner—Phan T. H. Palmer
(74) Attorney, Agent, or Firm—Baker Botts L.L.P.

(57) ABSTRACT

An optical apparatus includes an optical fiber and a lens having a first face coupled to the optical fiber and a second face angled with respect to the first face to direct reflections generated at the second face away from the optical fiber. In one embodiment, the lens comprises a segment of a gradient index lens. In another embodiment, a connector couples the lens to a second lens that comprises a second segment of the gradient index lens. In this embodiment, a second optical fiber couples to the second lens to facilitate duplex transmission of optical signals with the first optical fiber.

58 Claims, 11 Drawing Sheets-

U.S. PATENT DOCUMENTS

| | | | |
|---|---|---|---|
| 2,997,922 | 8/1961 | Kaprelian | 88/61 |
| 3,338,656 | 8/1967 | Asthelmer | 350/320 |
| 3,376,092 | 4/1968 | Kushner et al. | 350/285 |
| 3,514,183 | 5/1970 | Rabedeau | 350/160 |
| 3,520,595 | 7/1970 | Treuthart | 350/285 |
| 3,559,101 | 1/1971 | Parker et al. | 332/7.51 |
| 3,649,105 | 3/1972 | Treuthart | 350/285 |
| 3,666,358 | 5/1972 | Banks | 353/25 |
| 3,719,411 | 3/1973 | Midwinter | 350/96 |
| 3,770,347 | 11/1973 | Ambose et al. | 355/43 |
| 3,980,395 | 9/1976 | Giallorenzi et al. | 350/160 |
| 4,026,638 | 5/1977 | Govignon | 351/7 |
| 4,121,884 | 10/1978 | Greenwood | 350/96.15 |
| 4,135,791 | 1/1979 | Govignon | 351/7 |
| 4,165,155 | 8/1979 | Gordon, III et al. | 350/285 |
| 4,244,045 | 1/1981 | Nosu et al. | 370/3 |
| 4,249,814 | 2/1981 | Hull et al. | 354/154 |
| 4,278,327 | 7/1981 | McMahon et al. | 350/347 |
| 4,303,302 | 12/1981 | Ramsey et al. | 350/96.2 |
| 4,329,017 | 5/1982 | Kapany et al. | 350/96.15 |
| 4,355,864 | 10/1982 | Soref | 350/96.18 |
| 4,361,911 | 11/1982 | Buser et al. | 455/605 |
| 4,385,799 | 5/1983 | Soref | 350/96.19 |
| 4,452,506 | 6/1984 | Reeve et al. | 350/96.2 |
| 4,456,329 | 6/1984 | Henderson et al. | 30/96.16 |
| 4,474,424 | 10/1984 | Wagner | 350/96.16 |
| 4,482,994 | 11/1984 | Ishikawa | 370/3 |
| 4,498,730 | 2/1985 | Tanaka et al. | 350/96.16 |
| 4,504,121 | 3/1985 | Carlsen et al. | 350/385 |
| 4,521,069 | 6/1985 | Ikeda | 350/96.13 |
| 4,521,071 | 6/1985 | Böhm | 350/96.18 |
| 4,613,203 | 9/1986 | Proetel et al. | 350/6.6 |
| 4,626,066 | 12/1986 | Levinson | 350/96.18 |
| 4,634,239 | 1/1987 | Buhrer | 350/486 |
| 4,657,339 | 4/1987 | Fick | 350/96.2 |
| 4,696,062 | 9/1987 | LaBudde | 455/612 |
| 4,714,326 | 12/1987 | Usui et al. | 350/485 |
| 4,738,500 | 4/1988 | Grupp et al. | 350/6.6 |
| 4,746,179 | 5/1988 | Dahne et al. | 350/96.1 |
| 4,789,215 | 12/1988 | Anderson et al. | 350/96.19 |
| 4,790,621 | 12/1988 | Calaby et al. | 350/96.2 |
| 4,796,263 | 1/1989 | Rampolla | 372/10 |
| 4,812,002 | 3/1989 | Kato et al. | 350/96.18 |
| 4,814,600 | 3/1989 | Bergström | 250/221 |
| 4,838,637 | 6/1989 | Torok et al. | 350/96.18 |
| 4,927,225 | 5/1990 | Levinson | 350/96.18 |
| 4,988,161 | 1/1991 | Fujikawa et al. | 350/96.2 |
| 5,000,534 | 3/1991 | Watanabe et al. | 350/96.2 |
| 5,024,504 | 6/1991 | Boudreau et al. | 350/96.18 |
| 5,026,138 | 6/1991 | Boudreau et al. | 350/96.2 |
| 5,031,987 | 7/1991 | Norling | 350/96.15 |
| 5,046,832 | 9/1991 | Bell | 359/305 |
| 5,064,263 | 11/1991 | Stein | 385/14 |
| 5,101,460 | 3/1992 | Richard | 385/37 |
| 5,111,323 | 5/1992 | Tanaka et al. | 359/139 |
| 5,135,590 | 8/1992 | Basavanhally et al. | 156/64 |
| 5,163,105 | 11/1992 | Knoll et al. | 385/44 |
| 5,199,088 | 3/1993 | Magel | 385/18 |
| 5,204,922 | 4/1993 | Weir et al. | 385/18 |
| 5,206,920 | 4/1993 | Cremer et al. | 385/37 |
| 5,208,880 | 5/1993 | Riza et al. | 385/18 |
| 5,221,987 | 6/1993 | Laughlin | 359/222 |
| 5,225,887 | 7/1993 | Lipson et al. | 356/345 |
| 5,227,911 | 7/1993 | Schiller et al. | 359/222 |
| 5,309,455 | 5/1994 | Adachi et al. | 372/25 |
| 5,323,224 | 6/1994 | Wada | 356/73.1 |
| 5,323,477 | 6/1994 | Lebby et al. | 385/129 |
| 5,335,300 | 8/1994 | Hartman et al. | 385/37 |
| 5,343,286 | 8/1994 | Keeble et al. | 356/73.1 |
| 5,343,541 | 8/1994 | Uken et al. | 385/16 |
| 5,343,546 | 8/1994 | Cronin et al. | 385/52 |
| 5,345,529 | 9/1994 | Sizer, II et al. | 385/147 |
| 5,361,315 | 11/1994 | Lewis et al. | 385/16 |
| 5,369,718 | 11/1994 | Kamata et al. | 385/21 |
| 5,379,142 | 1/1995 | Handa | 359/129 |
| 5,420,947 | 5/1995 | Li et al. | 385/37 |
| 5,436,986 | 7/1995 | Tsai | 385/16 |
| 5,436,991 | 7/1995 | Sunagawa et al. | 385/37 |
| 5,444,801 | 8/1995 | Laughlin | 385/16 |
| 5,457,760 | 10/1995 | Mizrahi | 385/37 |
| 5,479,543 | 12/1995 | Black | 385/31 |
| 5,500,911 | * 3/1996 | Roff | 385/33 |
| 5,521,733 | 5/1996 | Akiyama et al. | 359/127 |
| 5,553,175 | 9/1996 | Laughlin | 385/16 |
| 5,555,327 | 9/1996 | Laughlin | 385/16 |
| 5,555,558 | 9/1996 | Laughlin | 385/16 |
| 5,561,541 | 10/1996 | Sharp et al. | 359/66 |
| 5,566,260 | 10/1996 | Laughlin | 385/16 |
| 5,583,683 | 12/1996 | Scobey | 359/127 |
| 5,590,227 | 12/1996 | Osaka et al. | 385/53 |
| 5,594,578 | 1/1997 | Ainslie et al. | 359/127 |
| 5,621,829 | 4/1997 | Ford | 385/22 |
| 5,627,925 | 5/1997 | Alferness et al. | 385/17 |
| 5,640,479 | 6/1997 | Hegg et al. | 385/120 |
| 5,647,033 | 7/1997 | Laughlin | 385/16 |
| 5,652,816 | 7/1997 | Minami et al. | 385/31 |
| 5,664,034 | 9/1997 | Mock | 385/16 |
| 5,699,462 | 12/1997 | Fouquet et al. | 385/18 |
| 5,727,099 | 3/1998 | Harman | 385/52 |
| 5,732,168 | 3/1998 | Donald | 385/16 |
| 5,748,812 | 5/1998 | Buchin | 385/18 |
| 5,774,604 | 6/1998 | McDonald | 385/18 |
| 5,799,121 | * 8/1998 | Duck et al. | 385/47 |
| 5,828,799 | 10/1998 | Donald | 385/16 |
| 5,841,916 | 11/1998 | Laughlin | 385/16 |
| 5,845,023 | * 12/1998 | Lee | 385/33 |
| 5,850,493 | * 12/1998 | Cheng | 385/27 |
| 5,875,271 | 2/1999 | Laughlin | 385/16 |
| 5,892,863 | 4/1999 | Presby | 385/6 |
| 5,909,301 | 6/1999 | Laughlin | 359/222 |
| 5,917,641 | 6/1999 | Laughlin | 359/222 |

OTHER PUBLICATIONS

Katsuhiko Hirabayashi, Tsuyoshi Yamamoto, and Shigeki Hino; "Optical backplane with free–space optical interconnections using tunable beam deflectors and a mirror for bookshelf–assembled terebit per second class asynchronous transfer mode switch", 1998 Society of Photo–Optical Instrumentation Engineers; all.

Jonathan Krishnamoorthy and Kees Propstra; "A Concept Becomes Reality! JDS Fitel's COADM for Dynamic Wavelength Management"; Product Application Engineers, JDS Fitel; all.

"BeamBox Solid State Optical Switches"; Akzo Nobel ABD; all.

95921362; Dec. 09, 1997; Supplementary European Search Report; all.

Steffen Glockner, Rolf Goring, Bernt Gotz and Andreas Rose; "Piezoelectrically driven micro–optic fiber switches", Optical Engineering, vol. 37, No. 4, Apr. 1998; all.

U.S. patent application Ser. No. 09/111,455, entitled "Method and Appratus for Aligning Optical Fibers," filed Jul. 8, 1995.

* cited by examiner

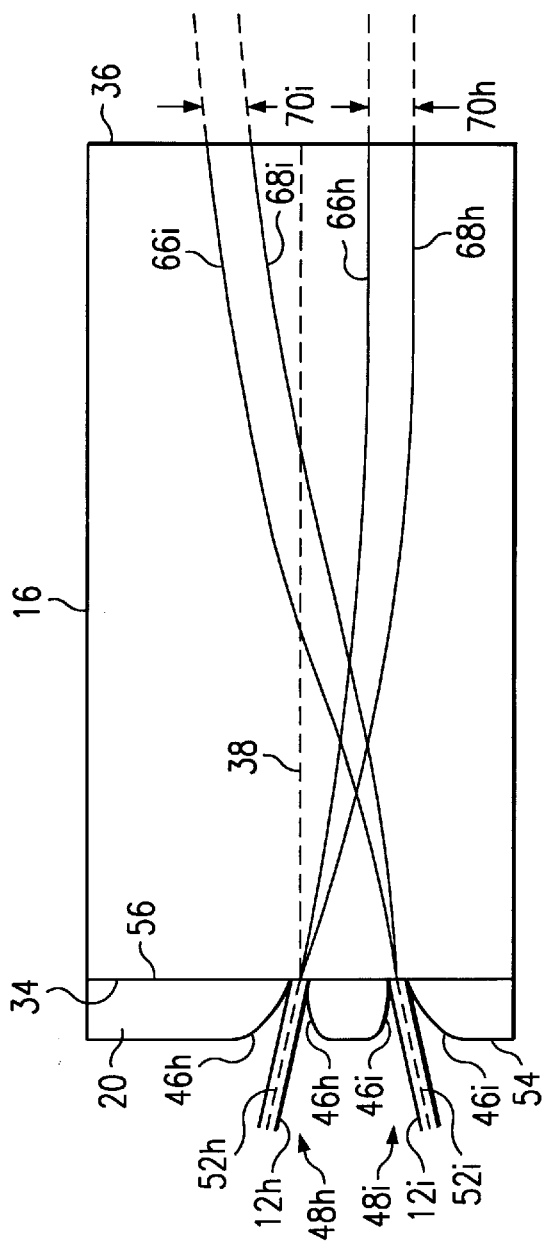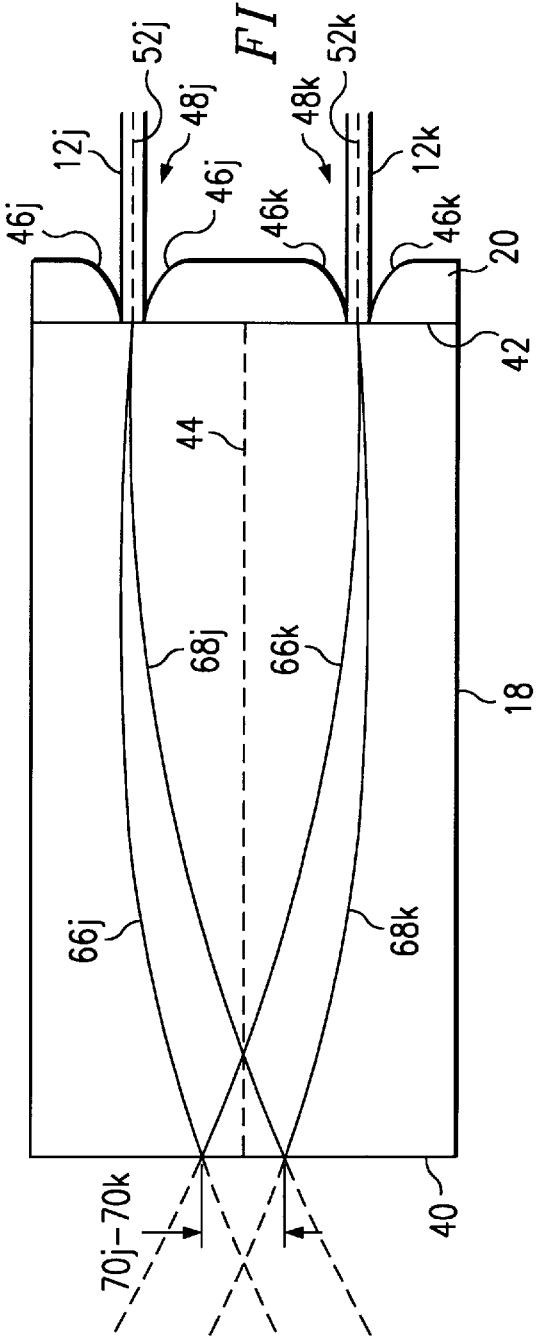

METHOD AND APPARATUS FOR CONNECTING OPTICAL FIBERS

CROSS REFERENCE TO RELATED APPLICATIONS

This application is related to U.S. patent application Ser. No. 09/111,455 now U.S. Pat. No. 6,137,930, filed on Jul. 8, 1998, by Richard H. Laughlin and entitled "Method and Apparatus for Aligning Optical Fibers," and pending U.S. patent application Ser. No. 09/111,571, filed on Jul. 8, 1998, by Richard H. Laughlin and entitled "Method and Apparatus for Aligning Optical Fibers Using an Alignment Spacer."

TECHNICAL FIELD OF THE INVENTION

This invention relates to the field of optical devices and more particularly to a method and apparatus for connecting optical fibers.

BACKGROUND OF THE INVENTION

When an optical signal traverses an interface between materials having dissimilar refractive indices, a portion of the optical signal reflects off the interface as a Fresnel reflection. Fresnel reflections caused by a connection of optical devices may introduce noise in an optical system and result in optical signal transmission losses. Where optical fibers are used for duplex transmission of optical signals, crosstalk between fibers can occur.

SUMMARY OF THE INVENTION

In accordance with the present invention, an apparatus for connecting optical fibers is provided that substantially eliminates or reduces disadvantages and problems associated with previous techniques.

In accordance with one embodiment of the present invention, an apparatus for connecting an optical fiber includes an optical fiber and a lens having a first face coupled to the optical fiber and a second face angled with respect to the first face to direct reflections generated at the second face away from the optical fiber. Another embodiment of the present invention is a method for manufacturing an optical apparatus that includes cutting an optically transmissive material at an angle to define a first lens and a second lens. The first lens has a first face and a second face and the second lens has a first face and a second face. The method continues by coupling a first optical fiber to the first face of the first lens. The method concludes by coupling a second optical fiber to the second face of the second lens.

Technical advantages of the present invention include an optical apparatus that includes a lens having a first face coupled to an optical fiber and a second face angled with respect to the first face to direct reflections generated at the second face away from the optical fiber. In one embodiment, multiple optical fibers are coupled to the first face of the lens. By angling the second face of the lens with respect to the first face, the optical apparatus directs reflections generated at the second face away from the multiple optical fibers to reduce cross-talk among the optical fibers. In another embodiment, the optical apparatus includes one or more optical fibers coupled to a second lens. The second lens removably couples to the first lens to facilitate full duplex transmission of optical signals between the optical fibers coupled to the first lens and the optical fibers coupled to the second lens.

Further technical advantages of the present invention include an alignment spacer that aligns multiple optical fibers arranged in two dimensions. By tapering an alignment hole of the alignment spacer, an optical fiber may be accurately positioned in the alignment hole such that the longitudinal axis of the fiber core is aligned with the center of the tapered alignment hole. The fiber may be inserted in the alignment hole beyond the spacer until a proper fit is maintained. The extending portion of the fiber is then removed to facilitate mounting to an optical device. The alignment spacer and the aligned optical fibers mount to optical switches, lenses, other optical fibers, or any other suitable optical device. In one embodiment, the optical fiber is also tapered at one end to resist tipping in the tapered alignment hole and to create a stronger, more accurate fit between the optical fiber and the tapered alignment hole. In another embodiment, a bonding material (e.g., epoxy, glue, cement, adhesive) is disposed between the optical fiber and the tapered alignment hole to strengthen the fit between and maintain the position of the optical fiber in the tapered alignment hole.

Still further technical advantages of the present invention include an apparatus that mounts optical fibers to an optical device in a particular output displacement in response to the input angle of an optical signal and at a particular output angle in response to the input displacement of the optical signal. Mounting optical fibers in these positions and angles allows each fiber to capture substantially all of the illuminance of the corresponding optical signal as it exits the optical device. The apparatus further mounts an optical fiber to an optical device in a particular input displacement and at a particular input angle. The optical signal emitted by the optical fiber is characterized by an output angle in response to the input displacement of the optical fiber, and an output displacement in response to the input angle of the optical fiber. By controlling input displacement and input angle of the optical fiber mounted to the optical device, the output angle and output displacement of the emitted optical signal may be tuned.

BRIEF DESCRIPTION OF THE DRAWINGS

For a more complete understanding of the present invention and its advantages, reference is now made to the following description taken in conjunction with the accompanying figures in which like reference numbers indicate like features and wherein:

FIGS. 9A and 9B illustrate an alignment spacer coupled to a collimating lens and a decollimating lens, respectively;

DETAILED DESCRIPTION OF THE INVENTION

Figure 1:
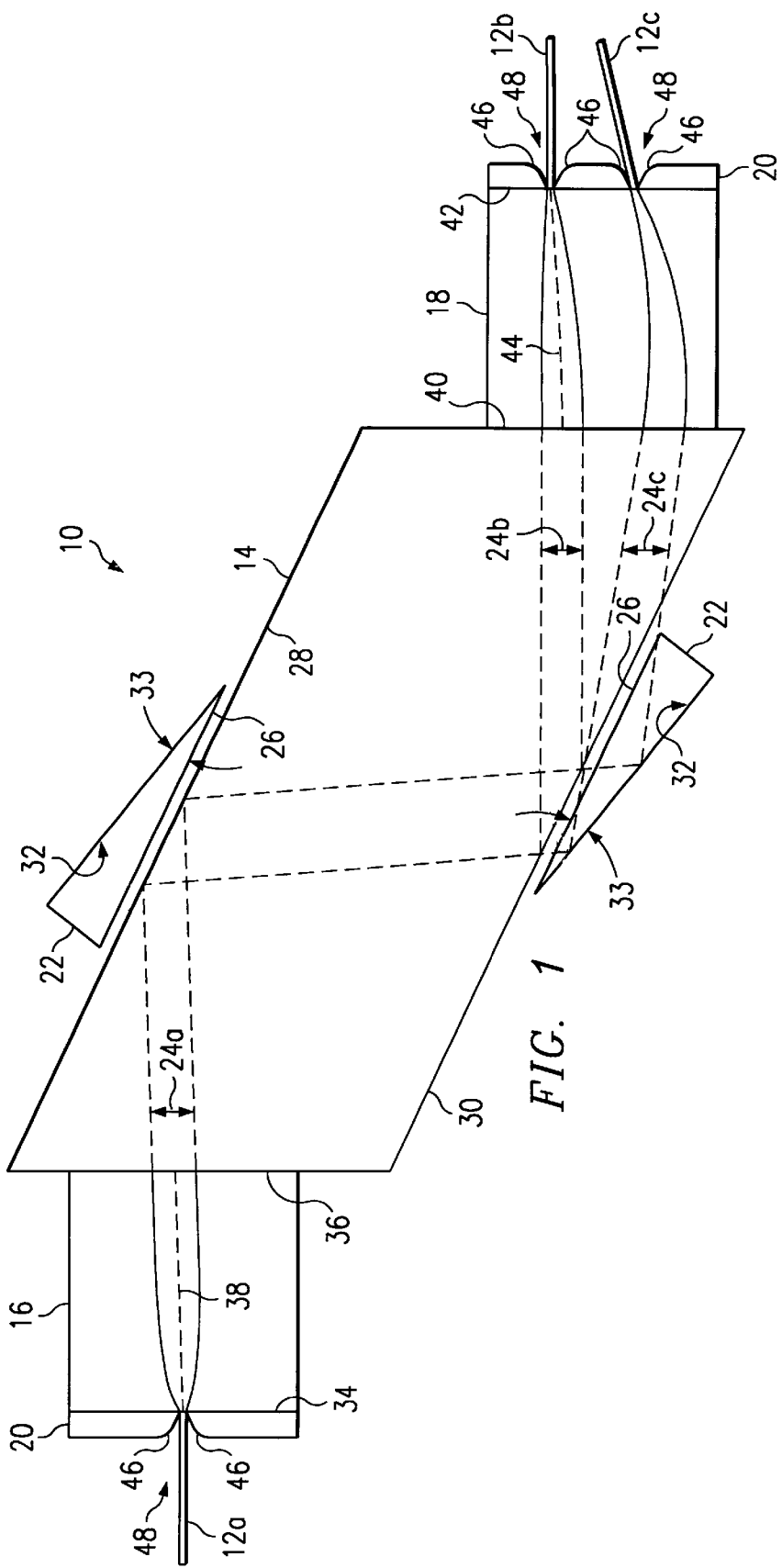
FIG. 1 illustrates an optical system constructed in accordance with the teachings of the present invention.

FIG. 1 illustrates an optical system 10 that includes a refractor 14, a collimating lens 16, a decollimating lens 18, alignment spacers 20 mounted to lenses 16 and 18, and switchplates 22. In general, lens 16 collimates an optical signal from an input fiber 12a into beam 24a for entry into refractor 14. Beam 24a propagates through refractor 14 by reflecting off reflecting surfaces 28 and 30 of refractor 14 by total internal reflection (TIR), by reflecting off reflective surfaces 32 of switchplates 22, or both, depending on the position of switchplates 22. Decollimating lens 18 focuses reflected beams 24b and 24c for communication to output fibers 12b and 12c.

Optical fibers 12a, 12b, and 12c (referred to generally as 12) comprise a glass core designed to transmit information in the form of light pulses, and a glass cladding that surrounds the glass core to prevent the light from escaping the core during transmission. Fiber 12 may comprise a multi-mode fiber having a large core (e.g., 62 microns wide) or a single mode fiber having a small core (e.g., 9 microns wide). Although the following description is detailed with reference to a fiber 12 having a circular cross-section, it should be understood that the cross-section of fiber 12 may have any suitable shape including, but not limited to, an oval or a circle having grooves or notches. In one embodiment, the cross-section of fiber 12 has a diameter measuring approximately 0.125 mm.

Refractor 14 may comprise a rhomboid, a prism, or any other configuration of optically transmissive material, such as glass. Refractor 14 may be selected to provide a particular index of refraction, n, at a particular wavelength of beam 24. Reflecting surfaces 28 and 30 of refractor 14 reflect signal 26 by total internal reflection (TIR). Alignment spacers 20 comprise glass, ceramic, metal, or any other material suitable to align and mount fibers 12 to lenses 16 and 18. Alignment spacers 20 include tapered alignment walls 46 that define tapered alignment holes 48 for aligning fibers 12.

Collimating lens 16 comprises glass or any other suitable optically transmissive material having a first face 34, a second face 36, and an optical axis 38. Decollimating lens 18 also comprises glass or any other suitable optically transmissive material having a first face 40, a second face 42, and an optical axis 44. In a particular embodiment, lenses 16 and 18 comprise gradient index (GRIN) lenses. This description and appended claims refer to both "one-quarter" and "one-half" pitch GRIN lenses. It should be understood that these terms contemplate and intend to cover GRIN lenses with adjustments in length that vary from one-quarter and one-half pitch to fine tune the collimation of optical beams or the overall performance of system 10.

Switchplates 22 comprise any suitable refractive material having a contact surface 26 and reflective surface 32. Each switchplate 22 may be formed in many configurations without deviating from the inventive concepts of the present invention. Reflective surface 32 of switchplate 22 is at bias angle 33 in one or more planes with respect to contact surface 26. The reflectivity of surface 32 may be caused by total internal reflection or by reflective material. It is noted that reflective surface 32 of switchplate 22 may also be non-reflective or optically absorbing. Switchplate 22 has a first position spaced apart from refractor 14 and a second position in proximal contact with refractor 14 to frustrate the total internal reflection of beam 24. The term proximal contact refers not only to direct contact between switchplate 22 and refractor 14, but also contemplates any spacing or partial contact between switchplate 22 and refractor 14 to frustrate the total internal reflection of beam 24 to a desired degree. In one embodiment, the spacing between switchplate 22 and refractor 14 may be controlled to perform a variable signal splitter or attenuator function.

In operation, lens 16 collimates an optical signal from input fiber 12 into a collimated input beam 24a for introduction into refractor 14. In one embodiment collimated input beam 24a is reflected at reflecting surfaces 28 and 30 of refractor 14 by total internal reflection and forms collimated output beam 24b. Decollimating lens 18 focuses collimated output beam 24b for communication to fiber 12b. In another embodiment, switchplate 22 is placed in proximal contact with reflecting surface 30 of refractor 14 to frustrate the total internal reflection of collimated beam 24a. In this embodiment, beam 24a reflects off reflective surface 32 of switchplate 22 to form collimated output beam 24c, which may enter decollimating lens 18 at a different input angle and position as beam 24b. Decollimating lens 18 focuses collimated output beam 24c for communication to fiber 12c.

Although optical system 10 is described with reference to placing a single switchplate 22 in proximal contact with one or more refractors 14 to generate a collimated output beam 24, it should be understood that many switchplates 22 may be placed into or out of proximal contact with one or more refractors 14 to generate different collimated output beams 24. The position and angle of input fiber 12a with respect to axis 38 of collimating lens 16 controls the path of collimated beam 24a. Fibers 12b and 12c are mounted to decollimating lens 18 at a position and at an angle with respect to optical axis 44 in response to the position and angle of beams 24b and 24c contacting first face 40, respectively. Tapered alignment walls 46 align fibers 12 in the proper position and at the proper angle within tapered alignment holes 48.

Figure 2:
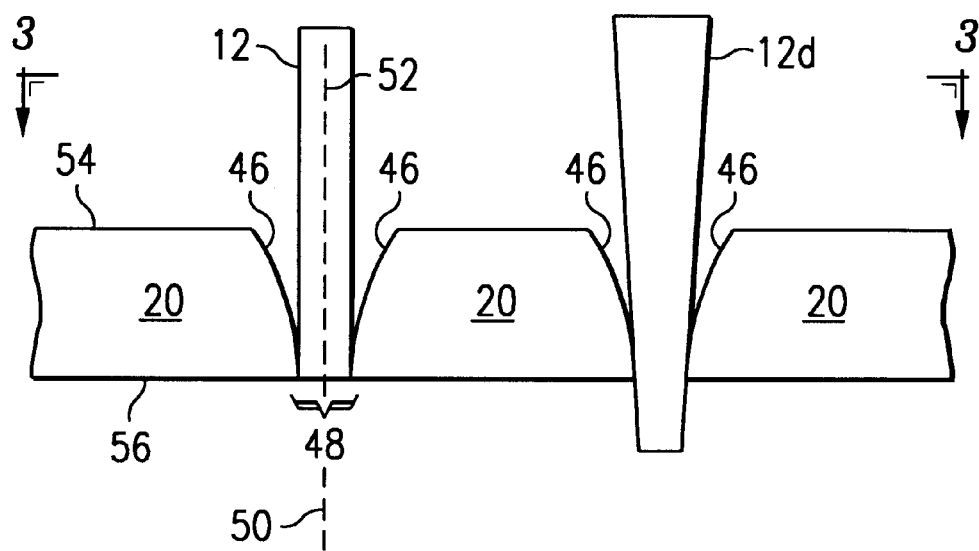
FIG. 2 illustrates a portion of one embodiment of an alignment spacer of the optical system.

FIG. 2 illustrates in more detail portions of alignment spacer 20 having tapered alignment walls 46 that define a tapered alignment hole 48. Tapered alignment hole 48 has a longitudinal axis 50. The core and cladding of fiber 12 are oriented about a longitudinal axis 52. In general, tapered alignment walls 46 position fiber 12 within tapered alignment hole 48 such that longitudinal axis 52 of fiber 12 aligns with longitudinal axis 50 of alignment hole 48. Alignment spacer 20 accurately positions multiple fibers 12 in two dimensions for precise mounting to lenses 16 or 18, an optical switch, an amplifier, another optical fiber, or any other suitable optical device.

Fiber 12 may be tapered at one end, as illustrated by fiber 12d of FIG. 2, to assist inserting, positioning, and aligning fiber 12 in tapered alignment hole 48. Tapered fiber 12d resists tipping in tapered alignment hole 48 and creates a stronger, more accurate fit with tapered alignment hole 48. Fiber 12d may be formed by conventional etching techniques or by an alternative process whereby one end of fiber 12 is dipped into any suitable chemical solvent or etching solution that increasingly strips away the outer layers of fiber 12 as a function of time. Fiber 12d is removed from the solvent or etching solution at a predetermined rate such that the dipped end of fiber 12d is tapered to a desired taper angle. Changing the rate of removing fiber 12d changes the taper angle and the curve of the tapered end.

Alignment spacer 20 includes tapered alignment walls 46 that extend from a first surface 54 to a second surface 56 to define a tapered alignment hole 48. The diameter of tapered alignment hole 48 at second surface 56 is smaller than the diameter of tapered alignment hole 48 at first surface 54. Although FIG. 2 illustrates two tapered alignment holes 48, it should be understood that spacer 20 may include many tapered alignment holes 48 arranged in any two-dimensional configuration suitable for mounting optical fibers 12 to any optical device. Furthermore, although the following description is detailed with reference to holes 48 having circular cross-sections, it should be understood that each hole 48 may have any suitable shape to receive the corresponding shape of an optical fiber 12. In one embodiment, the diameter of tapered alignment hole 48 at first surface 54 measures approximately 0.194 mm, while the diameter of hole 48 at second surface 56 measures approximately 0.125 mm.

Figure 3:
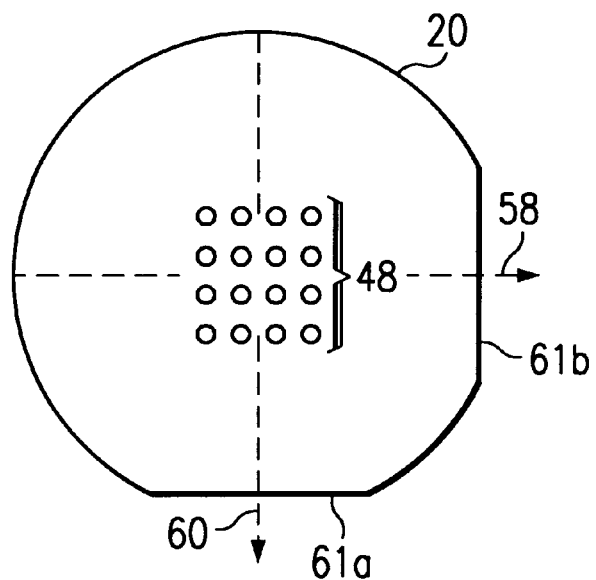
FIG. 3 illustrates the alignment spacer taken along line 3—3 of FIG. 2.

FIG. 3 illustrates a view of alignment spacer 20 taken along lines 3—3 of FIG. 2. Alignment spacer 20 includes a possible configuration of tapered alignment holes 48 arranged in two dimensions with respect to a y-axis 58 and a z-axis 60, where the x-axis is into the page. Although FIG. 3 illustrates sixteen tapered alignment holes 48 arranged in an orthogonal grid, it should be understood that alignment spacer 20 may include any suitable number of tapered alignment holes 48 arranged in any two-dimensional configuration suitable for receiving optical fibers 12 and mounting to an optical switch, an amplifier, a lens, or any other suitable optical device. Prior attempts to align fiber 12 using "V" shaped grooves cannot accurately position fibers in two dimensions and may not be able to tolerate close spacings for fibers 12.

Alignment spacer 20 further includes flat surfaces, notches, grooves, or any other suitable alignment indicators 61a and 61b (generally referred to as 61) that reference the arrangement of tapered alignment holes 48 to facilitate accurate and consistent mounting of fibers 12 to spacer 20, spacer 20 to an optical device, or one spacer 20 to another spacer 20. For example, FIG. 3 illustrates an orthogonal grid having four rows of tapered alignment holes 48 substantially parallel to flat surface 61a and four columns of holes 48 substantially parallel to flat surface 61b. Flat surfaces 61a and 61b of spacer 20 may be aligned with mating flat surfaces 61 of an optical device or with mating flat surfaces 61 of another alignment spacer 20 to align the corresponding tapered alignment holes 48.

Figure 4A:
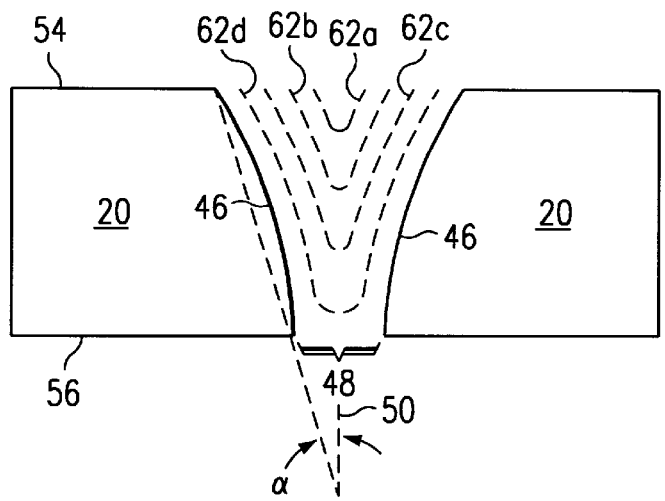
FIGS. 4A–4D are cross-sectional diagrams illustrating one method for aligning an optical fiber using the alignment spacer.

Referring to FIG. 4A, conventional drilling techniques may be used to form tapered alignment hole 48 in alignment spacer 20, including laser drilling techniques using an excimer laser, a neodymium laser, or any other suitable laser. In one embodiment, a series of laser pulses form increasingly deeper wells in spacer 20 as illustrated by dashed lines 62a–62d until tapered alignment hole 48 is formed. Tapered alignment walls 46 formed by the series of laser pulses extend from surface 54 to surface 56 with a nominal taper angle of α from longitudinal axis 50. Nominal taper angle α depends on the manner in which hole 48 is formed, such as the power, duty cycle, type, and other settings of a laser, the type and size of fiber 12, and other factors. In a particular embodiment, taper angle a may range from approximately two to fifteen degrees. Tapered alignment walls 46 may comprise any shape or configuration, including a straight line. In one embodiment, walls 46 generally define a continuous curve that bends from the wider end of hole 48 at surface 54 to the tapered end of hole 48 at surface 56 despite any localized variations or deviations.

Figure 4B:
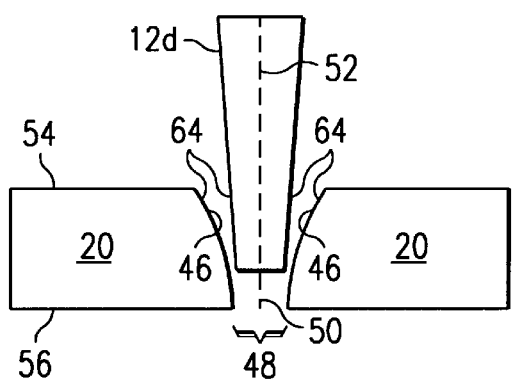
Figure 4C:
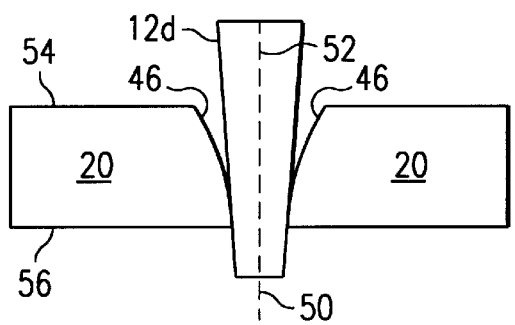

Referring to FIG. 4B, the tapered end of fiber 12d is inserted in tapered alignment hole 48 of spacer 20. In this embodiment, the diameter of hole 48 at first surface 54 may measure approximately 0.194 mm, while the diameter of hole 48 at second surface 56 may measure approximately 0.060 mm. Although FIGS. 4A through 4D are described with reference to tapered fiber 12d, it should be understood that the method for aligning fiber 12 illustrated by FIGS. 4A through 4D also apply to a non-tapered fiber 12. A layer 64 of bonding material may be disposed between fiber 12d and alignment walls 46 of spacer 20 to strengthen the fit between and maintain the position of fiber 12d in tapered alignment hole 48. Fiber 12d is wedged into hole 48 until, in one embodiment, the tapered end of fiber 12d extends beyond hole 48 of spacer 20, as illustrated in FIG. 4C. In this position, longitudinal axis 52 of fiber 12d is aligned with longitudinal axis 50 of hole 48 and fiber 12d maintains a strong fit in hole 48 of spacer 20.

Figure 4D:
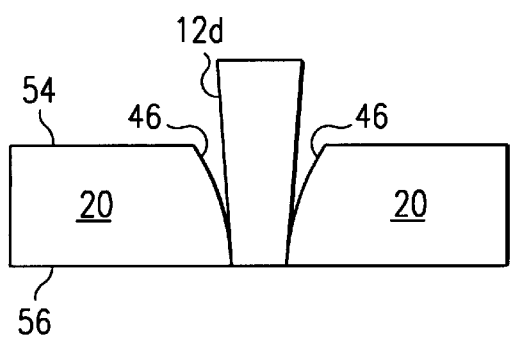

Referring to FIG. 4D, the tapered end of fiber 12d that extends beyond hole 48 of spacer 20 is polished, cut, sheared, or otherwise removed, so that the end of fiber 12d terminates at a position that is substantially level with second surface 56 of alignment spacer 20. In one embodiment, the tapered end of fiber 12d is removed by using conventional etching techniques. Alignment spacer 20 is then mounted to lenses 16 or 18, an optical switch, an amplifier, another optical fiber, or any other optical device that requires precise alignment of mounted fibers 12. Accurately positioning fiber 12d in tapered alignment hole 48 such that longitudinal axis 52 of fiber 12d is aligned with longitudinal axis 50 of hole 48, and precisely mounting spacer 20 to an optical device, reduces the amount of light that is lost during transmission through the interface between the optical device and fiber 12d.

Figure 5A:
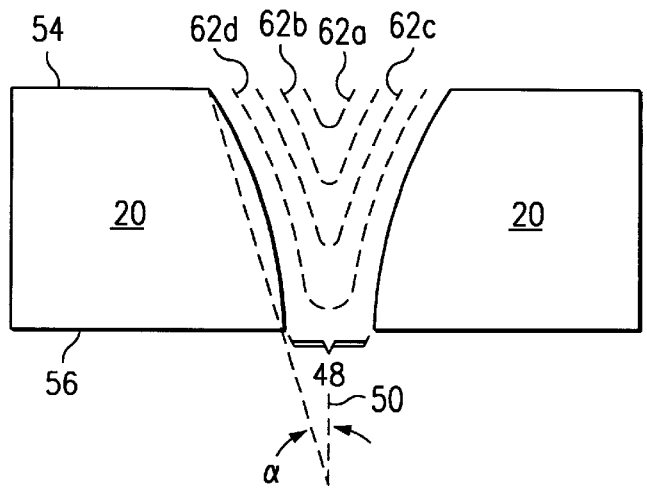
FIGS. 5A–5D are cross-sectional diagrams illustrating an alternative method for aligning an optical fiber using the alignment spacer.

FIGS. 5A through 5D are cross sectional diagrams illustrating an alternative method for aligning optical fiber 12. Referring to FIG. 5A, conventional drilling techniques may be used to form tapered alignment hole 48 in alignment spacer 20. For example, as described above with reference to FIG. 4A, laser drilling techniques may be used to form increasingly deeper wells 62a–62d in alignment spacer 20 until tapered alignment hole 48 is formed. Tapered alignment walls 46 formed by these drilling techniques exhibit a nominal taper angle of α from longitudinal axis 50. In a particular embodiment, taper angle α may range from approximately two to fifteen degrees.

Figure 5B:
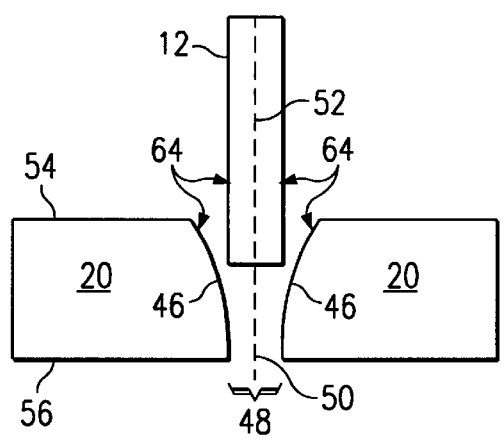
Figure 5C:
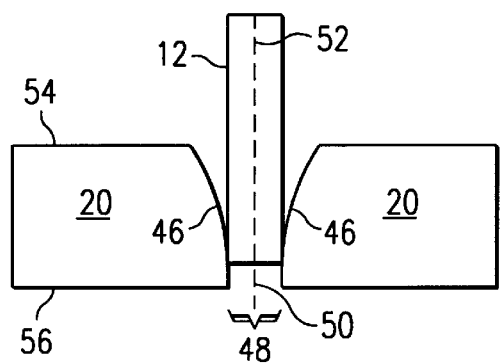

Referring to FIG. 5B, one end of fiber 12 is inserted into tapered alignment hole 48 of spacer 20. Although FIGS. 5A through 5D are described with reference to a non-tapered fiber 12, it should be understood that the method for aligning fiber 12 illustrated by FIGS. 5A through 5D also applies to a tapered fiber 12d. A layer 64 of bonding material may be disposed between fiber 12 and alignment wall 46 of spacer 20 to strengthen the fit between and maintain the position of fiber 12 in tapered alignment hole 48. Fiber 12 is wedged into hole 48 until a secure fit is achieved, as illustrated in FIG. 5C. In this position, longitudinal axis 52 of fiber 12 is aligned with longitudinal axis 50 of hole 48.

Figure 5D:
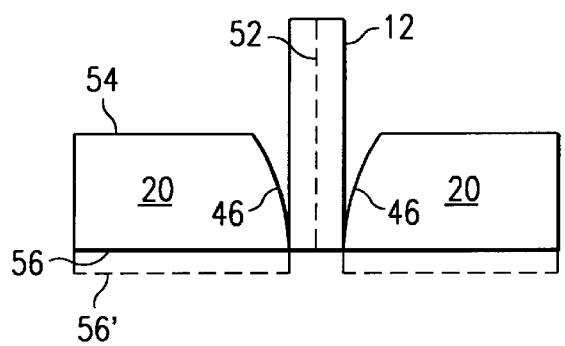

Referring to FIG. 5D, the second surface of alignment spacer 20 is polished, cut, sheared, or otherwise removed, as illustrated by dashed lines 56', until the end of fiber 12 terminates at a position that is substantially level with second surface 56 of alignment spacer 20. In one embodiment, the second surface of spacer 20 is removed by using conventional etching techniques. In this embodiment, the diameter of hole 48 at first surface 54 may measure approximately 0.194 mm, while the diameter of hole 48 at second surface 56 may measure approximately 0.120 mm. Alignment spacer 20 is then mounted to lenses 16 or 18, an optical switch, an amplifier, another optical fiber, or any other optical device that requires precise alignment of mounted fibers 12.

Figure 6A:
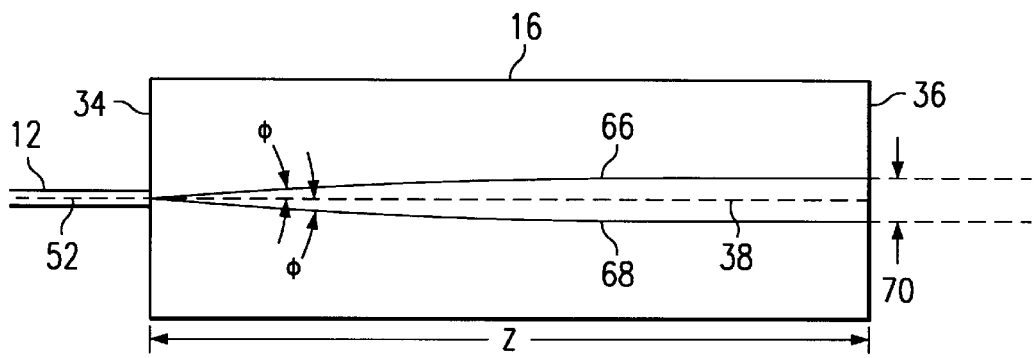
FIGS. 6A–6D are diagrams illustrating a side view of a collimating lens of the optical system.

FIG. 6A illustrates, in more detail, collimating lens 16 having first face 34, second face 36, and optical axis 38. In a particular embodiment, lens 16 comprises a gradient index (GRIN) lens having a one-quarter pitch. Fiber 12 is mounted to first face 34 such that longitudinal axis 52 of fiber 12 is aligned with optical axis 38. In general, fiber 12 emits an optical signal that enters first face 34 of lens 16 on axis 38 and parallel to axis 38. Lens 16 collimates the optical signal as a diverging beam defined by first trace 66 and second trace 68. Traces 66 and 68 diverge from axis 38 by a half angle of divergence of fiber 12, φ, until contacting second face 36 to define an aperture 70. Axis 38 is aligned with the center of aperture 70.

Figure 6B:
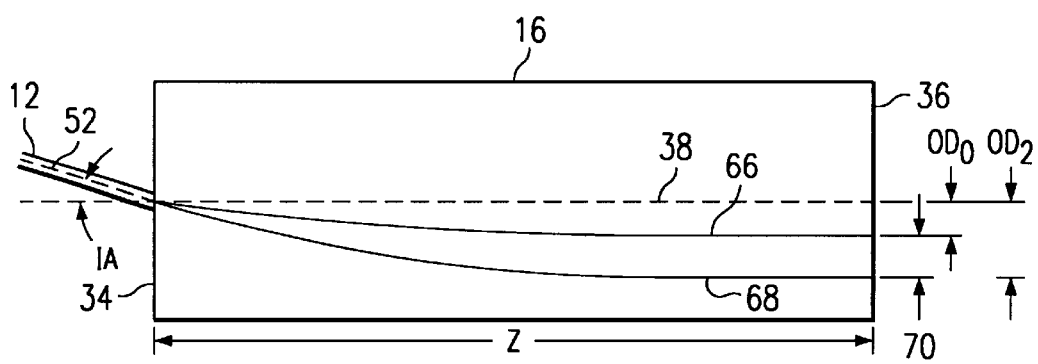

FIG. 6B illustrates fiber 12 mounted to first face 34 of lens 16 such that longitudinal axis 52 of fiber 12 is at an input angle, IA, with respect to axis 38. Traces 66 and 68 propagate through lens 16 as illustrated and define aperture 70 on second face 36 of lens 16. Traces 66 and 68 exit second face 36 displaced from axis 38 by output displacements $OD_0$ and $OD_2$, respectively, in response to input angle IA of fiber 12. Therefore, FIG. 6B illustrates that fiber 12 mounted to first face 34 of lens 16 at an input angle IA results in output displacements $OD_0$ and $OD_2$ for traces 66 and 68, respectively.

Figure 6C:
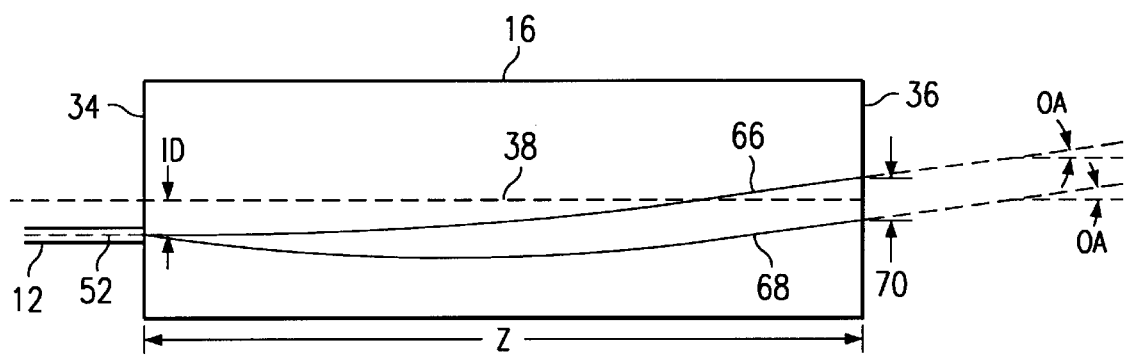

FIG. 6C illustrates fiber 12 mounted to first face 34 of lens 16 parallel to but displaced from optical axis 38 by an input displacement, ID. Traces 66 and 68 propagate through lens 16 as illustrated and define aperture 70 on second face 36 of lens 16. The center of aperture 70 is aligned with axis 38, but traces 66 and 68 exit second face 36 at an output angle, OA, with respect to axis 38 in response to input displacement ID of fiber 12. Therefore, FIG. 6C illustrates that fiber 12 mounted to first face 34 of lens 16 at input displacement ID results in output angle OA for traces 66 and 68.

Figure 6D:
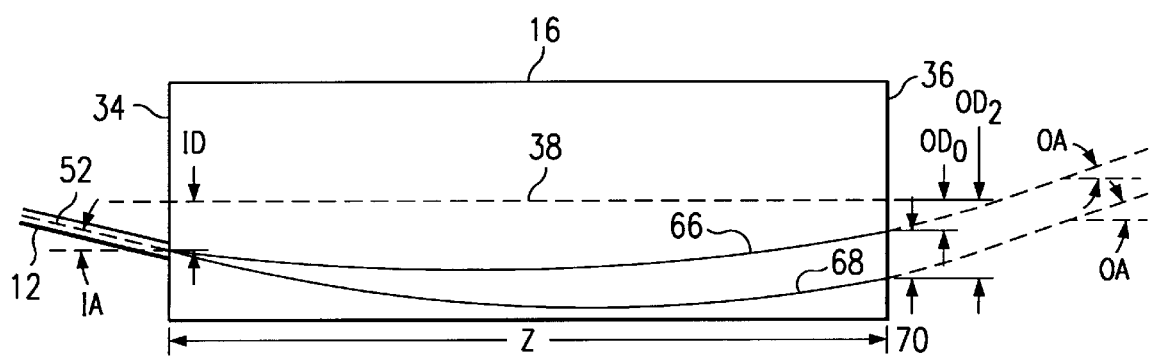

FIG. 6D illustrates fiber 12 mounted to first face 34 of lens 16 displaced from optical axis 38 by an input displacement ID and at an input angle IA with respect to axis 38. Traces 66 and 68 propagate through lens 16 as illustrated and define aperture 70 on second face 36 of lens 16. Traces 66 and 68 exit second face 36 displaced from axis 38 by output displacements $OD_0$ and $OD_2$, respectively, in response to input angle IA of fiber 12. Furthermore, traces 66 and 68 exit second face 36 at an output angle, OA, to axis 38 in response to input displacement ID of fiber 12. Therefore, FIG. 6D illustrates that input displacement ID of fiber 12 mounted to first face 34 of lens 16 results in output angle OA for traces 66 and 68, and that input angle IA of fiber 12 results in output displacements $OD_0$ and $OD_2$ for traces 66 and 68, respectively.

Lens 16 comprises glass or any other suitable optically transmissive material that collimates an optical signal from first face 34 to second face 36. Optical axis 38 comprises an imaginary line through the optical center of lens 16 that is perpendicular to both first face 34 and second face 36. The optical signal emitted by fiber 12 comprises visible light, infrared radiation, ultraviolet radiation, or any other suitable collimated or decollimated optical signal operating at a particular wavelength. In operation, the optical signal enters first face 34 of lens 16 at a particular input displacement ID and at a particular input angle IA. Lens 16 collimates the optical signal as a collimated beam defined by traces 66 and 68 that may be modeled by the following propagation equations:

$$\begin{bmatrix} OD_j \\ OA \end{bmatrix} = \begin{vmatrix} \cos(\sqrt{a} \cdot Z) & \frac{1}{N \cdot \sqrt{a}} \cdot \sin(\sqrt{a} \cdot Z) \\ -N \cdot \sqrt{a} \cdot \sin(\sqrt{a} \cdot Z) & \cos(\sqrt{a} \cdot Z) \end{vmatrix} \cdot \begin{bmatrix} ID_j \\ TA_j \end{bmatrix}$$

where:
$\sqrt{a}$=gradient constant of lens;
Z=length of lens;
N=index of refraction of lens at optical axis;
ID=input displacement;
IA=input angle;
φ=half angle of beam divergence in fiber;
TA=trace angle=$(-\phi+j) \cdot (\phi+IA)$;
OD=output displacement;
OA=output angle; and
j=0,2.

By controlling input displacement ID and input angle IA of fiber 12 mounted to first face 34 of lens 16, output angle OA and output displacements, $OD_0$ and $OD_2$, of traces 66 and 68 may be tuned.

Although the previous description is detailed with reference to collimating lens 16, it should be understood that the propagation equations also apply to decollimating lens 18. In this embodiment, decollimating lens 18 receives a collimated beam at first face 40, such as, for example, collimated beam 24c from refractor 14 as illustrated in FIG. 1. The geometric center of the collimated beam, the centroid of the collimated beam, or any other suitable reference location of the collimated beam, enters first face 40 at a particular input angle IA and input displacement ID with respect to optical axis 44 of lens 18. Lens 18 decollimates and focuses the beam. The focused signal exits second face 42 at an output angle in response to the input displacement of the collimated beam and at an output displacement in response to the input angle of the collimated beam. A fiber 12 is mounted to second face 42 at the output displacement and at the output angle of the focused signal. Mounting fiber 12 at the output displacement of the focused signal in response to the input angle of the collimated beam, and at the output angle of the focused signal in response to the input displacement of the collimated beam, allows fiber 12 to capture substantially all of the illuminance of the focused signal as it exits second face 42 of lens 18.

Figure 7:
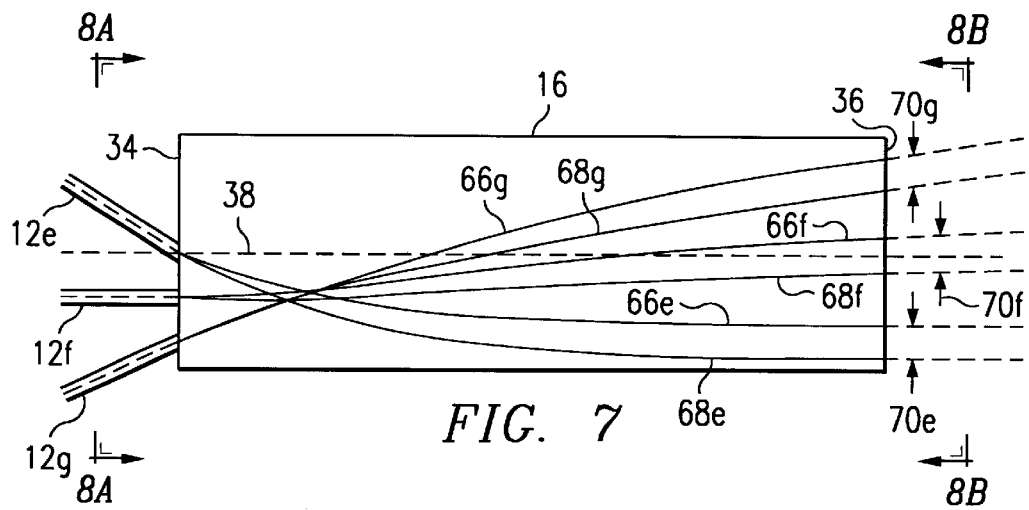
FIG. 7 illustrates a side view of another embodiment of the collimating lens.

FIG. 7 illustrates fibers 12e–12g mounted to first face 34 of lens 16 at particular input displacements and input angles with respect to optical axis 38. Although FIG. 7 is a side view of lens 16 that does not show the depth of fibers 12e–12g, it should be understood that fibers 12e–12g may be mounted to first face 34 angled in two directions. Fibers 12e–12g transmit optical signals that enter first face 34 of lens 16. Lens 16 collimates the optical signals defined by first traces 66e–66g and second traces 68e–68g. Traces 66e–66g and 68e–68g propagate through lens 16 according to the propagation equations and exit second face 36 at particular output displacements and output angles in response to the input angles and input displacements, respectively, of mounted fibers 12e–12g. Traces 66e–68e, 66f–68f, and 66g–68g define apertures 70e, 70f, and 70g, respectively, on second face 36 of lens 16.

Figure 8A:
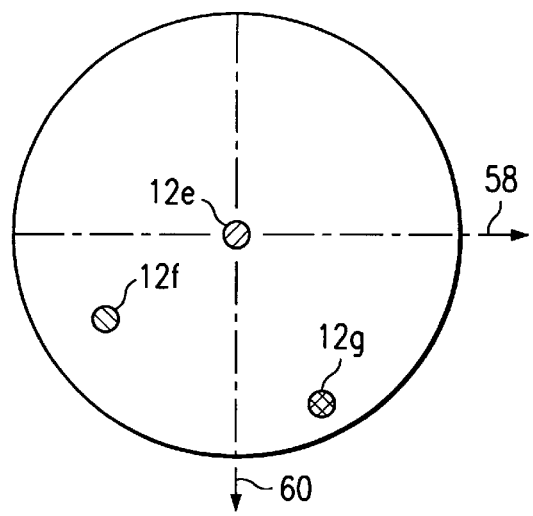
FIGS. 8A and 8B illustrate a first face and a second face, respectively, of the collimating lens.

FIG. 8A illustrates a view of first face 34 taken along line 8A—8A of FIG. 7. FIG. 8A further illustrates a possible configuration of mounted fibers 12e–12g of FIG. 7. For example, fibers 12e–12g are mounted to first face 34 at positions along y-axis 58, and z-axis 60. Shading is used to differentiate the fibers at each position. Although FIG. 8A illustrates fibers 12e–12g mounted to first face 34 along different points on both y-axis 58 and z-axis 60, it should be understood that any fiber 12 may be mounted to first face 34 at a common position on either y-axis 58, z-axis 60, or both, as any other fiber 12. Any fiber 12 may also be mounted at any angle of orientation about y-axis 58, z-axis 60, or both.

Figure 8B:
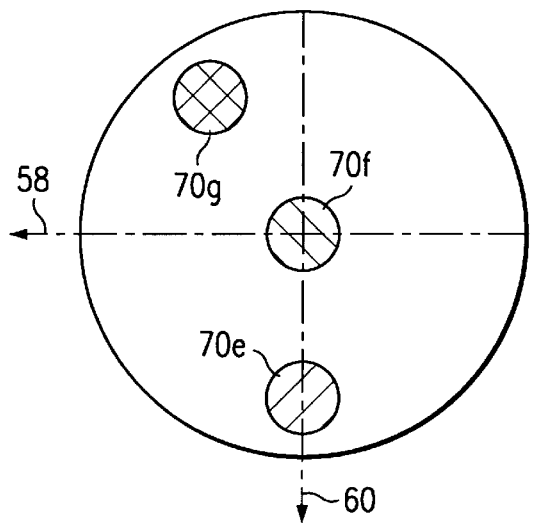

FIG. 8B illustrates a view of second face 36 taken along line 8B—8B of FIG. 7. FIG. 8B further illustrates apertures 70e, 70f, and 70g. Traces 66e–68e, 66f–68f, and 66g–68g exit second face 36 at different positions along y-axis 58 and z-axis 60 to define apertures 70e, 70f, and 70g, in response to the input displacements and input angles of mounted fibers 12e–12g of FIG. 8A. It can be seen from FIGS. 7, 8A, and 8B that the input angles of mounted fibers 12e–12g result in output displacements for apertures 70e–70g along both y-axis 58 and z-axis 60. Similarly, input displacements of mounted fibers 12e–12g result in output angles for apertures 70e–70g. For example, aperture 70g exits second face 36 at a particular output angle and output displacement in response to fiber 12g that is mounted to first face 34 tipped in pitch with respect to y-axis 58 and tipped in yaw with respect to z-axis 60.

FIG. 9A illustrates an alignment spacer 20 coupled to first face 34 of lens 16. Fibers 12h and 12i are mounted to first face 34 at particular input displacements and input angles with respect to optical axis 38. Fibers 12h and 12i emit optical signals that enter first face 34 of lens 16. Lens 16 collimates the optical signals as diverging beams defined by traces 66h–68h and 66i–68i that propagate through lens 16 according to the propagation equations. Traces 66h–68h and 66i–68i exit second face 36 to define apertures 70h and 70i at particular output displacements and output angles responsive to the input displacements and input angles of mounted fibers 12h and 12i. Alignment walls 46h and 46i of alignment spacer 20 are tapered and angled to facilitate positioning fibers 12h and 12i in tapered alignment holes 48h and 48i such that longitudinal axis 52h and 52i are positioned, angled, and mounted precisely to first surface 34 of lens 16. By controlling the input displacements and input angles of fibers 12h and 12i mounted to first face 34 of lens 16, the output angles and output displacements of apertures 70h and 70i may be tuned.

FIG. 9B illustrates an alignment spacer 20 coupled to second face 42 of lens 18. Apertures 70j and 70k define the entry interface of two collimated beams with first face 40 of lens 18. The two collimated beams enter first face 40 at the same input displacement centered on optical axis 44, but at different input angles with respect to axis 44. Lens 18 decollimates the collimated beams as represented by traces 66j–68j and 66k–68k. The decollimated beams propagate through lens 18 according to the propagation equations and exit second face 42 at output displacements and output angles in response to the input angles and input displacements, respectively, of the corresponding collimated beams. Fibers 12j and 12k are mounted to second face 42 of lens 18 at the output displacements and output angles of the decollimated beams. Alignment walls 46j and 46k of alignment spacer 20 are tapered and angled to facilitate positioning fibers 12j and 12k in tapered alignment holes 48j and 48k such that longitudinal axis 52j and 52k are positioned, angled, and mounted precisely to second surface 42 of lens 18. By mounting fibers 12j and 12k to second face 42 at output displacements in response to the input angles of the collimated beams, and at output angles in response to the input displacements of the collimated beams, fibers 12j and 12k capture substantially all of the illuminance of the decollimated beams as they exit second face 42 of lens 18, even if apertures 70j and 70k of the corresponding collimated beams have the same input displacement on first face 40 of lens 18.

Figure 10:
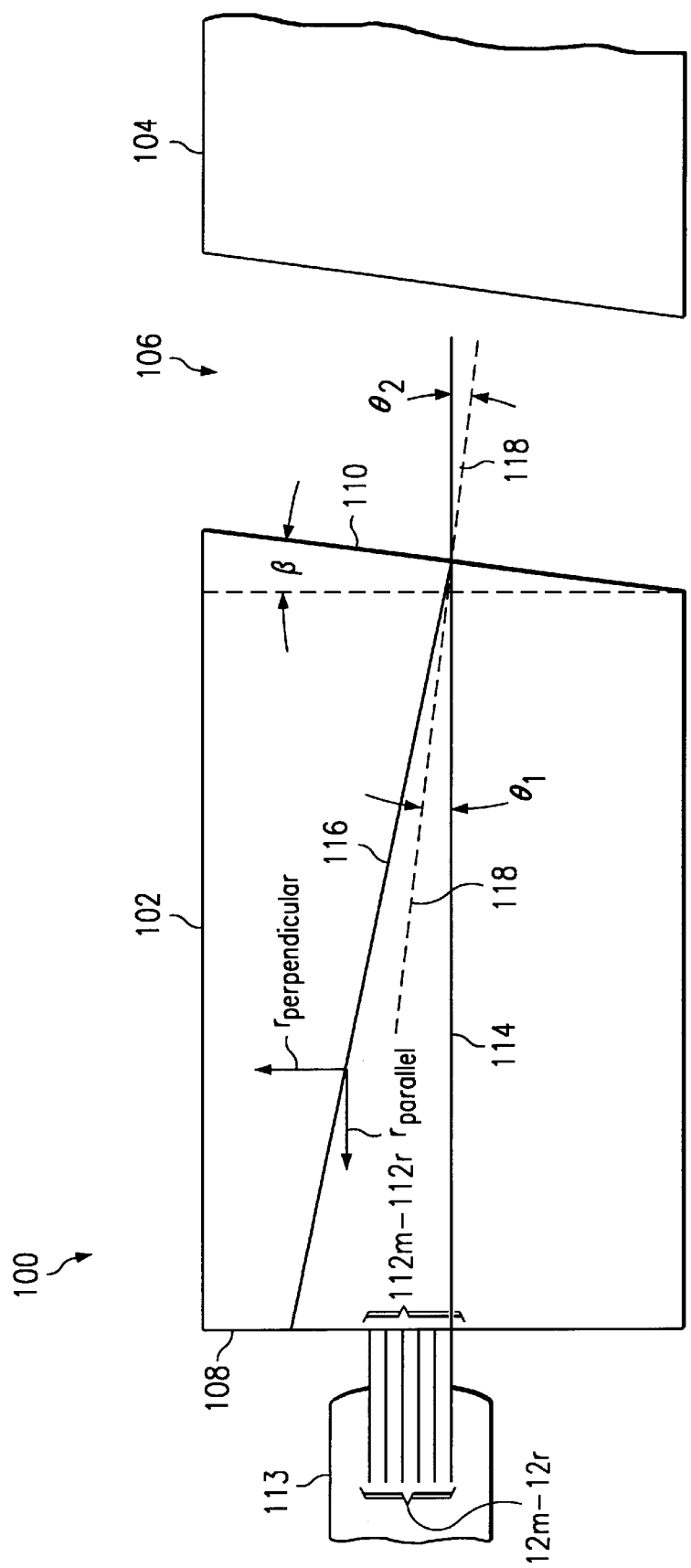
FIG. 10 illustrates one embodiment of an optical apparatus constructed in accordance with the teachings of the present invention.

FIG. 10 illustrates a diagram of an optical apparatus 100 that includes a first refractive material 102, a second refractive material 104, and a third refractive material 106 disposed between materials 102 and 104. Material 102 has a first face 108 and a second face 110. Second face 110 is sloped at an angle β with respect to first face 108. Optical fibers 12m–12r (referred to generally as 12) couple to first face 108 at positions 112m–112r (referred to generally as 112). A sheathing 113 may cover fibers 12m–12r. In general, an optical fiber 12 communicates an optical signal 114 to second face 110. A portion of optical signal 114 reflects off the interface between materials 102 and 106 back toward first face 108 as a reflection 116, such as a Fresnel reflection. By sloping second face 110 at an angle β with respect to first face 108, second face 110 directs reflection 116 away from fibers 12.

Refractive materials 102 and 104 comprise a lens, a rhomboid, a prism, or any other suitable configuration of optically transmissive material, such as glass. Each of refractive materials 102 and 104 may be selected to provide a particular index of refraction, $n_{102}$ and $n_{104}$, respectively, at a particular wavelength of signal 114. Although the following description is detailed with reference to second refractive material 104 comprising a lens, it should be understood that material 104 may comprise a lens, an optical switch, a transmitter, a receiver, or any other suitable optical device. In one embodiment, refractive materials 102 and 104 comprise first and second segments of the same one-half pitch gradient index lens (GRIN). In this embodiment, materials 102 and 104 share a common index of refraction. Third refractive material 106 comprises air or any other suitable material that has an index of refraction, $n_{106}$. For example, material 106 may comprise an air gap between materials 102 and 104.

Fibers 12 couple to first face 108 of material 102 at positions 112. In a particular embodiment, fibers 12 couple to first face 108 arranged in a two-dimensional pattern. For example, an alignment spacer 20 having tapered alignment holes arranged in two dimensions may couple fibers 12 to first face 108 in a two-dimensional pattern. Sheathing 113 comprises one or more layers of plastic, resin, or any other suitable substance that surrounds and protects fibers 12. Each fiber 12 supports full duplex transmission of an optical signal 114. For example, each fiber 12 may transmit and receive an optical signal 114. Optical signal 114 comprises visible light, infrared radiation, ultraviolet radiation, or any other suitable collimated or decollimated optical signal operating at a particular wavelength.

Fresnel reflection 116 comprises a reflection of a portion of optical signal 114 that results when optical signal 114 strikes second face 110 that defines an interface between materials 102 and 104 having dissimilar refractive indices. Fresnel reflection 116 includes a component perpendicular to optical signal 114, $r_{perpendicular}$, and a component parallel to optical signal 114, $r_{parallel}$. The magnitude of Fresnel reflection 116 may be modeled by the following Fresnel equations:

$$r \text{ perpendicular} = 10 \cdot \log\left[\frac{(\sin(\theta_1 - \theta_2))^2}{(\sin(\theta_1 + \theta_2))^2}\right]$$

$$r \text{ parallel} = 10 \cdot \log\left[\frac{(\tan(\theta_1 - \theta_2))^2}{(\tan(\theta_1 + \theta_2))^2}\right]$$

where:

$\theta_1$=angle of incidence of signal 114;

$$\theta_2 = a\sin\left(\frac{n_{102} \cdot \sin(\theta_1)}{n_{106}}\right)$$

$n_{102}$=index of refraction of first refractive material 102;
$n_{106}$=index of refraction of third refractive material 106.

In operation, a fiber 12 communicates optical signal 114 to second face 110 of first refractive material 102 at an incidence angle $\theta_1$ with respect to an incidence axis 118. Incidence axis 118 comprises an imaginary line that is normal to second face 110. A portion of optical signal 114 reflects off second face 110 as Fresnel reflection 116. According to Snell's Law, the remaining portion of optical signal 114 propagates through second face 110 at an angle $\theta_2$ with respect to incidence axis 118. By sloping second face 110 at an angle β with respect to first face 108, second face 110 directs Fresnel reflection 116 away from fibers 12. Since fibers 12 may be used for duplex operations, directing Fresnel reflection 116 away from input positions 112 reduces cross-talk between fibers 12. In a particular embodiment, angle β of second face 110 is selected in response to the dimensions of the pattern of fibers 12 coupled to first face 108. Accordingly, second face 110 directs Fresnel reflection 116 a sufficient distance away from the two-dimensional pattern of fibers 12 to reduce cross-talk between fibers 12.

Figure 11A:
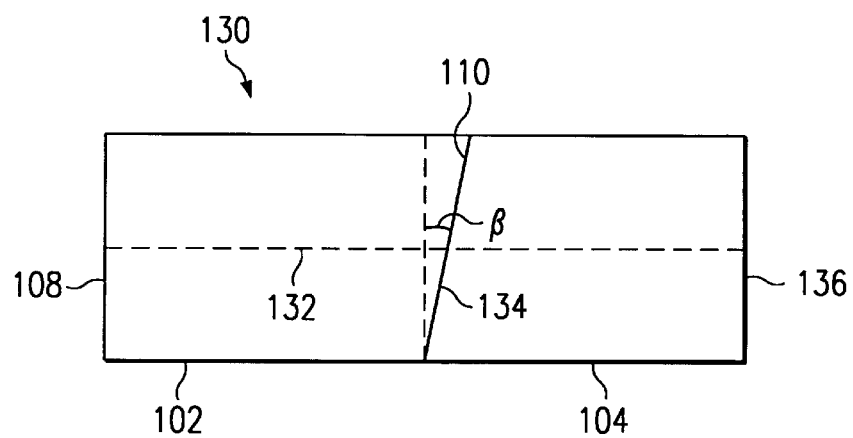
FIGS. 11A–11E illustrate one method for manufacturing the optical apparatus.

FIGS. 11A through 11E are cross-sectional diagrams illustrating one method for manufacturing optical apparatus 100. Referring to FIG. 11A, a refractive lens 130 includes a first face 108 and a second face 136. Conventional cutting techniques are used to slice refractive lens 130 at an angle β with respect to first face 108 to define first refractive material 102 and second refractive material 104. In a particular embodiment, angle β may range from approximately five to ten degrees. First refractive material 102 and second refractive material 104 comprise first and second segments of refractive material 130. First refractive material 102 includes first face 108 and second face 110. Second refractive material 104 includes a first face 134 and second face 136.

Refractive lens 130 may comprise a rhomboid, a prism, or any other suitable configuration of optically transmissive material, such as glass. In a particular embodiment, refractive lens 130 comprises a one-half pitch gradient index lens. An optical axis 132 comprises an imaginary line that is normal to first face 108. In one embodiment, refractive lens 130 is cut at angle β with respect to first face 108 such that the length of optical axis 132 extending from first face 108 to second face 110 of first refractive material 102 substantially equals the length of optical axis 132 extending from first face 134 to second face 136 of second refractive material 104.

Figure 11B:
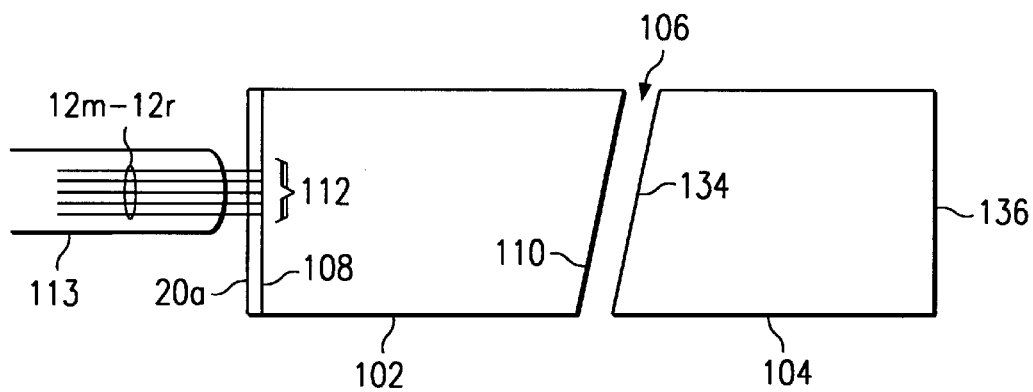

Referring to FIG. 11B, a bundle of optical fibers 12*m*–12*r* in sheathing 113 couple to first face 108 of first refractive material 102 at locations 112. In a particular embodiment, an alignment spacer 20*a* couples to first face 108 of first refractive material 102. Alignment spacer 20*a* includes tapered alignment holes arranged in any suitable configuration, such as, for example, a two-dimensional pattern. In this embodiment, fibers 12 are inserted in the tapered alignment holes of alignment spacer 20*a* to align each fiber 12 at its corresponding location 112.

Figure 11C:
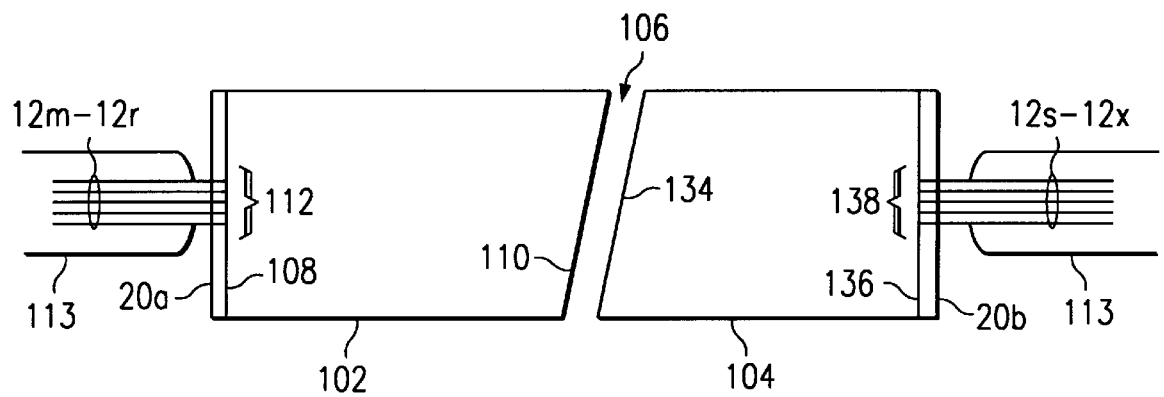

Referring to FIG. 11C, a bundle of fibers 12*s*–12*x* in sheathing 113 is coupled to second face 136 of second refractive material 104 at locations 138. In one embodiment, an alignment spacer 20*b* couples to second face 136 and includes tapered alignment holes that correspond with the tapered alignment holes of alignment spacer 20*a*. In this embodiment, output fibers 12 are inserted in the tapered alignment holes of alignment spacer 20*b* to align each fiber 12 at its corresponding location 138. Locations 138 may be selected in response to the angle at which signals 114 enter first face 134 of material 104. For example, each location 138 accounts for the angle $\theta_2$ resulting at the interface between materials 102 and 106 for each corresponding signal 114. Fibers 12 support full duplex transmission of optical signal 114 between materials 102 and 104. For example, each fiber 12 coupled to first face 108 of first refractive material 102 may transmit an optical signal 114 to and/or receive an optical signal 114 from at least one corresponding fiber 12 coupled to second face 136 of second refractive material 104.

Figure 11D:
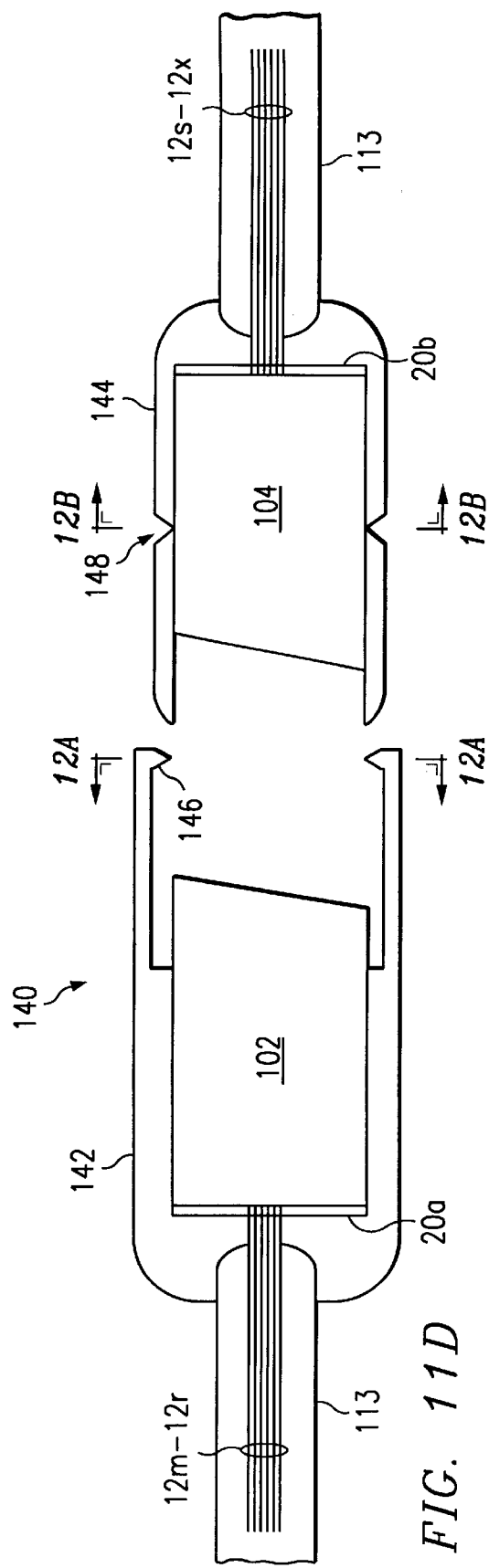
Figure 11E:
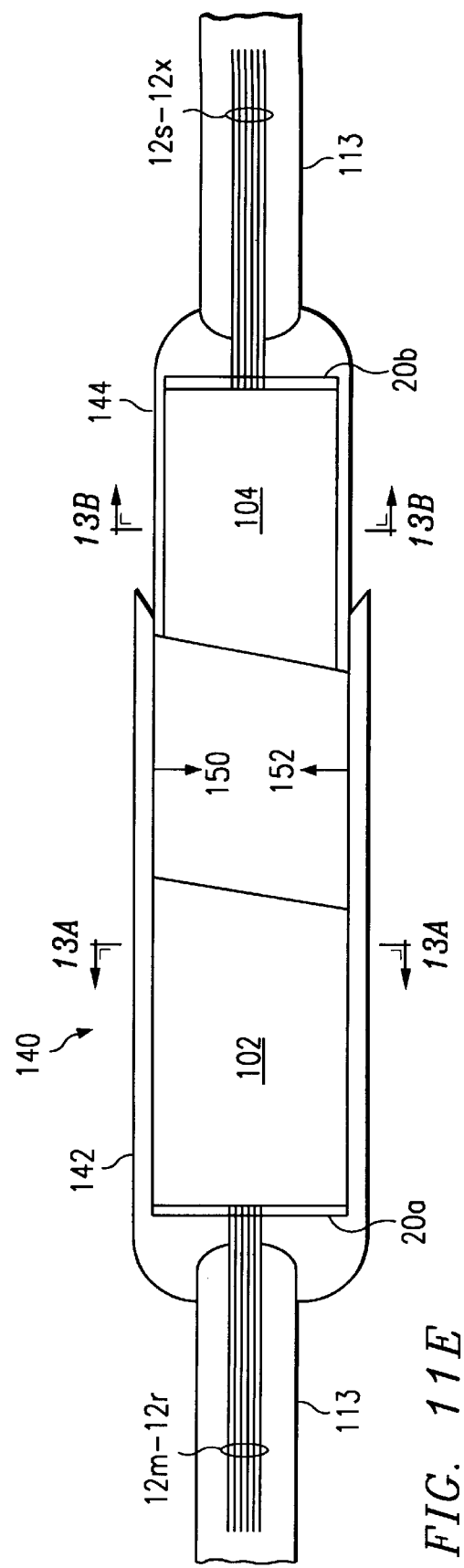

FIGS. 11D and 11E illustrate a connector 140 that removably couples first refractive material 102 to second refractive material 104. Connector 140 may comprise a sheathing, a sleeve, an expansion joint, or any other suitable connector that removably couples materials 102 and 104. In a particular embodiment, connector 140 includes a first fastener 142 coupled to material 102 and a second fastener 144 coupled to material 104. As shown, fasteners 142 and 144 may also include an integral or separate encasing to protect fibers 12 at the point where they exit sheathing 113 and enter spacer 20. Referring to FIG. 11D, first fastener 142 includes a protrusion 146 and second fastener 144 includes a notch 148 for receiving protrusion 146. By inserting fastener 144 into fastener 142 until protrusion 146 mates with notch 148, connector 140 removably couples materials 102 and 104 to allow bi-directional communication of optical signals 114 between fibers 12*m*–12*r* and 12*s*–12*x*. Materials 102 and 104 may be decoupled by removing protrusion 146 from notch 148 and separating fasteners 142 and 144. Referring to FIG. 11E, connector 140 includes a fastener 142 that receives fastener 144. Fastener 142 may be tapered and is biased as indicated by arrows 150 and 152 such that fastener 142 creates a press fit with fastener 144. By inserting fastener 144 into fastener 142 until a sufficient press fit is achieved, connector 140 removably couples materials 102 and 104. Materials 102 and 104 may be decoupled by separating fasteners 142 and 144.

Figure 12A:
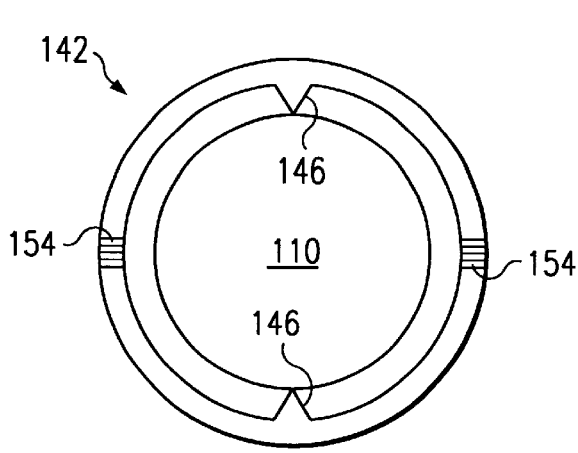
FIGS. 12A and 12B illustrate cross-sectional views taken along lines of FIG. 11D.
Figure 12B:
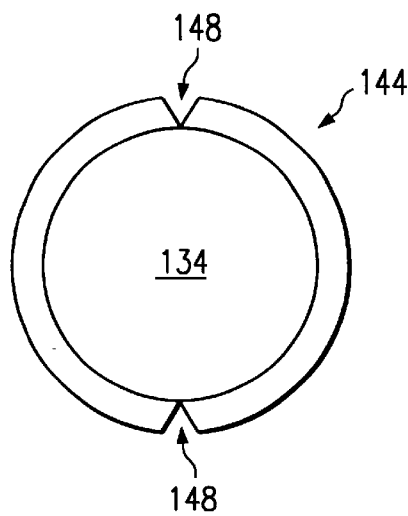

FIG. 12A illustrates a cross-sectional view of first fastener 142 taken along lines 12A—12A of FIG. 11D. FIG. 12B illustrates a cross-sectional view of second fastener 144 taken along lines 12B—12B of FIG. 11D. Protrusions 146 of fastener 142 mate with notches 148 of fastener 144 to removably couple faces 110 and 134 of materials 102 and 104. Protrusions 146 and notches 148 also align face 110 of material 102 properly with face 134 of material 104. Referring to FIG. 12A, fastener 142 may include expansion joints 154 that facilitate removing protrusions 146 from notches 148 to decouple materials 102 and 104.

Figure 13A:
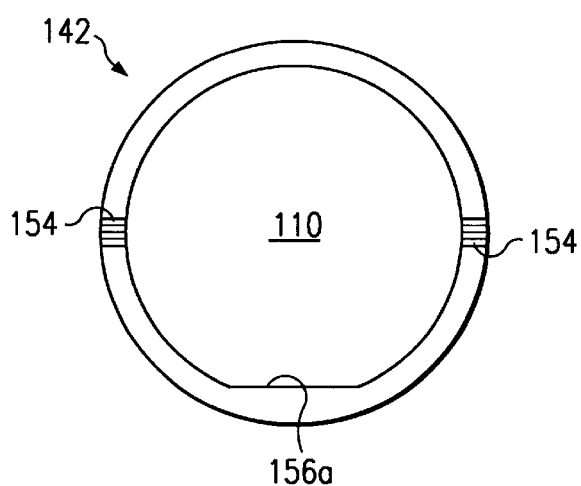
FIGS. 13A and 13B illustrate cross-sectional views taken along lines of FIG. 11E.
Figure 13B:
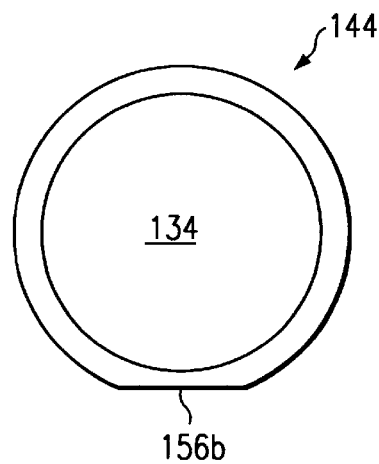

FIG. 13A illustrates a cross-sectional view of first fastener 142 taken along lines 13A—13A of FIG. 11E. FIG. 13B illustrates a cross-sectional view of second fastener 144 taken along lines 13B—13B of FIG. 11E. In one embodiment, fasteners 142 and 144 include flat surfaces 156a and 156b, respectively, to align face 110 of material 102 properly with face 134 of material 104 so that fibers 12m–12r coupled to face 108 of material 102 are aligned with fibers 12s–12x coupled to second face 136 of material 104. Referring to FIG. 13A, fastener 142 may include expansion joints 154 that facilitate separating fasteners 142 and 144 to decouple materials 102 and 104. Although FIGS. 12A, 12B, 13A, and 13B are described with reference to protrusions 146, notches 148, and flat surfaces 156a and 156b, it should be understood that connector 140 may include any suitable attachment mechanism and alignment indicator to couple and align faces 110 and 134 of materials 102 and 104.

Figure 14:
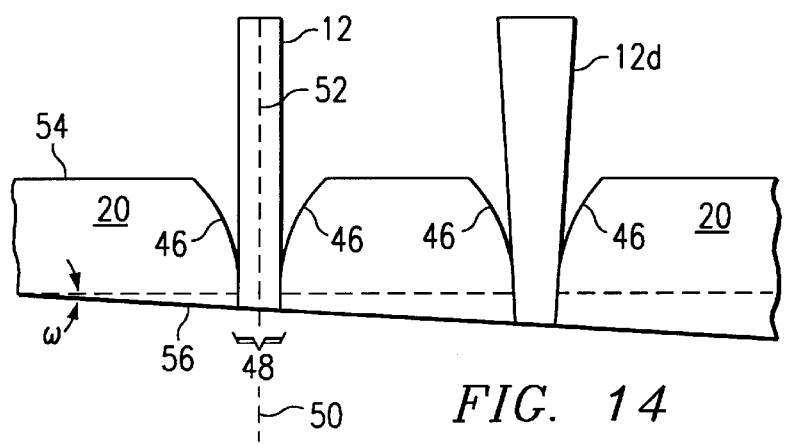
FIG. 14 illustrates a portion of one embodiment of an alignment spacer.

FIG. 14 illustrates in more detail portions of one embodiment of alignment spacer 20 that includes first surface 54 and second surface 56. Second surface 56 and the ends of fibers 12 inserted in tapered alignment holes 48 are polished, cut, or otherwise formed at an angle ω with respect to first surface 54. Alignment spacer 20 couples fibers 12 to first face 108 of material 102. In this embodiment, first face 108 of material 102 is angled to mate with angle ω of fiber 12. The boundary between each fiber 12 and first face 108 may define an interface between materials having dissimilar refractive indices. Accordingly, any optical signals 114 emitted by fiber 12 may result in Fresnel reflections at the interface between fiber 12 and first face 108. By coupling a fiber 12 to first face 108 at an interface that is angled, first face 108 directs any Fresnel reflection generated at first face 108 to reduce or eliminate the transmission of the reflection back through the core of fiber 12. By directing Fresnel reflections away from the core of fiber 12, optical apparatus 100 reduces noise and optical signal transmission losses. Although FIG. 14 is described with reference to alignment spacer 20 coupled to first face 108 of material 102, it should be understood that this technique for directing Fresnel reflections away from the core of a fiber 12 also applies to alignment spacer 20 coupled to second face 136 of material 104, as well as any other embodiment that uses alignment spacer 20.

Although the present invention has been described in several embodiments, a myriad of changes, variations, alterations, transformations, and modifications may be suggested to one skilled in the art, and it is intended that the present invention encompass such changes, variations, alterations, transformations, and modifications as fall within the spirit and scope of the appended claims.

What is claimed is:

1. An optical apparatus, comprising:
   a plurality of input optical fibers;
   a first lens having a first face, a second face, and an optical axis, wherein the first face is coupled to the input optical fibers and the second face is angled with respect to the normal of the optical axis to direct reflections generated at the second face away from the input optical fiber, wherein the angle of the second face is established in response to the distance between a first input optical fiber and a second input optical fiber;
   a plurality of output optical fibers; and
   a second lens having a first face removably coupled to the first lens and a second face coupled to the output optical fibers.

2. The apparatus of claim 1, wherein each output optical fiber coupled to the second face of the second lens optically communicates with a corresponding first optical fiber coupled to the input face of the first lens.

3. The apparatus of claim 1, wherein:
   the first face of the first lens receives an optical signal from at least one input optical fiber at an input displacement and an input angle; and
   at least one output optical fiber is coupled to the second face of the second lens at an output angle in response to the input displacement of the optical signal, and at an output displacement in response to the input angle of the optical signal.

4. The apparatus of claim 1, wherein the second face of the first lens is at an angle of approximately five to ten degrees with respect to the normal of the optical axis of the first lens.

5. The apparatus of claim 1, further comprising a connector operable to couple the first lens to the second lens.

6. The apparatus of claim 1, further comprising:
   a first alignment indicator coupled to the first lens; and
   a second alignment indicator coupled to the second lens.

7. The apparatus of claim 1, wherein the input optical fibers and the output optical fibers are arranged in two dimensions.

8. The apparatus of claim 1, wherein the input optical fibers and the output optical fibers are arranged in an orthogonal grid.

9. The apparatus of claim 1, further comprising an alignment spacer coupled to the first face of the first lens, the alignment spacer having a plurality of tapered alignment holes to position the input optical fibers.

10. The apparatus of claim 1, wherein the first face of the first lens is normal to the optical axis.

11. The apparatus of claim 1, wherein the second face of the first lens is angled with respect to the first face of the first lens.

12. An apparatus, comprising:
    a first optical fiber;
    a lens having a first face, a second face, and an optical axis extending from the first face to the second face, wherein the first face receives an optical signal from the first optical fiber at an input displacement and an input angle, and the second face is angled with respect to the normal of the optical axis to direct reflections generated at the second face away from the first optical fiber; and
    a second optical fiber having an end coupled to the second face of the lens at an output angle in response to the input displacement of the optical signal, and at an output displacement in response to the input angle of the optical signal.

13. The apparatus of claim 12, wherein:
    the output displacement comprises a distance between the optical axis of the lens and the second optical fiber at the second face; and
    the output angle comprises the angle at which the second optical fiber couples to the second face with respect to the optical axis of the lens.

14. The apparatus of claim 13, wherein the output angle of the second optical fiber is non-zero.

15. The apparatus of claim 12, wherein the lens comprises a decollimating lens.

16. The apparatus of claim 1, wherein:
    the input displacement comprises a distance between the optical axis of the lens and the optical signal at the first face; and
    the input angle comprises the angle at which the optical signal enters the first face with respect to the optical axis of the lens.

17. The apparatus of claim 12, wherein the reflections comprise Fresnel reflections.

18. The apparatus of claim 12, wherein the lens comprises a segment of a one-half pitch gradient index lens.

19. The apparatus of claim 12, wherein the second face of the lens is at an angle of approximately five to ten degrees with respect to the normal of the optical axis.

20. The apparatus of claim 12, further comprising an alignment spacer coupled to the first face of the lens, the alignment spacer having a tapered alignment hole to position the first optical fiber.

21. The apparatus of claim 12, wherein the first face is normal to the optical axis.

22. The apparatus of claim 12, wherein the second face is angled with respect to the first face.

23. An optical apparatus, comprising:
   a plurality of optical fibers; and
   a lens having a first face, a second face, and an optical axis extending from the first face to the second face, wherein the first face is coupled to the optical fibers and the second face is angled with respect to the normal of the optical axis to direct reflections generated at the second face away from the optical fibers, wherein the angle of the second face is established in response to the distance between a first optical fiber and a second optical fiber.

24. The apparatus of claim 23, wherein the optical fibers comprise input optical fibers and further comprising:
   a second lens removably coupled to the lens; and
   a plurality of output optical fibers coupled to the second lens.

25. The apparatus of claim 24, wherein the second lens comprises a segment of a one-half pitch gradient index lens.

26. The apparatus of claim 24, further comprising a connector operable to couple the lens to the second lens.

27. The apparatus of claim 24, further comprising:
   a first alignment indicator coupled to the lens; and
   a second alignment indicator coupled to the second lens.

28. The apparatus of claim 24, wherein each output optical fiber coupled to the second lens optically communicates with a corresponding input optical fiber coupled to the first face of the lens.

29. The apparatus of claim 23, wherein the optical fibers are arranged in two dimensions on the first face of the lens.

30. The apparatus of claim 23, wherein the optical fibers are arranged in an orthogonal grid on the first face of the lens.

31. The apparatus of claim 23, wherein:
   the optical fibers comprise input optical fibers;
   the first face receives an optical signal from at least one of the input optical fibers at an input displacement and an input angle; and
   further comprising a plurality of output optical fibers, at least one output optical fiber coupled to the second face of the lens at an output angle in response to the input displacement of the optical signal, and at an output displacement in response to the input angle of the optical signal.

32. The apparatus of claim 23, wherein the reflections comprise Fresnel reflections.

33. The apparatus of claim 23, wherein the lens comprises a segment of a one-half pitch gradient index lens.

34. The apparatus of claim 23, wherein the second face of the lens is at an angle of approximately five to ten degrees with respect to the normal of the optical axis.

35. The apparatus of claim 23, further comprising an alignment spacer coupled to the first face of the lens, the alignment spacer having a plurality of tapered alignment holes to position the optical fibers.

36. The apparatus of claim 23, wherein the first face is normal to the optical axis.

37. The apparatus of claim 23, wherein the second face is angled with respect to the first face.

38. A method for manufacturing an optical apparatus, comprising:
   cutting an optically transmissive material at an angle to define a lens having a first face and a second face;
   coupling a first optical fiber to the first face of the lens to emit an optical signal at an input displacement and an input angle; and
   coupling a second optical fiber to the second face of the lens at an output angle in response to the input displacement of the optical signal, and at an output displacement in response to the input angle of the optical signal.

39. The method of claim 38, wherein the output angle of the second optical fiber is non-zero.

40. The method of claim 38, wherein the angle is cut such that the second face of the lens directs reflections generated at the second face of the lens away from the first optical fiber.

41. The method of claim 38, wherein the lens comprises a one-half pitch gradient index lens.

42. The method of claim 38, wherein the lens comprises a decollimating lens.

43. The method of claim 38, wherein the angle is approximately five to ten degrees with respect to the first face of the lens.

44. The method of claim 38, wherein:
   the input displacement comprises a distance between the optical axis of the lens and the optical signal at the first face; and
   the input angle comprises the angle at which the optical signal enters the first face with respect to the optical axis of the lens.

45. The method of claim 38, wherein:
   the output displacement comprises a distance between the optical axis of the lens and the second optical fiber at the second face; and
   the output angle comprises the angle at which the second optical fiber couples to the second face with respect to the optical axis of the lens.

46. The method of claim 38, wherein the step of coupling the first optical fiber comprises:
   positioning the first optical fiber in a tapered alignment hole of an alignment spacer; and
   coupling the alignment spacer to the first face of the lens.

47. The method of claim 38, wherein the lens has an optical axis and the angle is cut such that the second face of the lens is angled with respect to the normal of the optical axis.

48. A method for manufacturing an optical apparatus, comprising:
   cutting an optically transmissive material at an angle to define a first lens and a second lens, the first lens having a first face and a second face and the second lens having a first face and a second face;
   coupling a plurality of input optical fibers to the first face of the first lens; and
   coupling a plurality of output optical fibers to the second face of the second lens;
   wherein the angle is cut in response to the distance between a first input optical fiber and a second input optical fiber such that the second face of the first lens directs reflections generated at the second face of the first lens away from the input optical fibers.

49. The method of claim 48, wherein the input optical fibers are arranged in two dimensions on the first face of the first lens.

50. The method of claim 48, wherein the input optical fibers are arranged in an orthogonal grid on the first face of the first lens.

51. The method of claim 48, wherein the lens comprises a decollimating lens.

52. The method of claim 48, wherein:
- the first face of the first lens receives an optical signal from at least one input optical fiber at an input displacement and an input angle; and
- at least one output optical fiber is coupled to the second face of the second lens at an output angle in response to the input displacement of the optical signal, and at an output displacement in response to the input angle of the optical signal.

53. The method of claim 48, wherein each output optical fiber coupled to the second face of the second lens optically communicates with a corresponding input optical fiber coupled to the first face of the first lens.

54. The method of claim 48, wherein the optically transmissive material comprises a one-half pitch gradient index lens.

55. The method of claim 48, wherein the reflections comprise Fresnel reflections.

56. The method of claim 48, wherein the second face of the first lens is at an angle of approximately five to ten degrees with respect to the first face of the first lens.

57. The method of claim 48, further comprising removably coupling the second lens to the first lens.

58. The method of claim 48, wherein the first lens has an optical axis and the angle is cut such that the second face of the first lens is angled with respect to the normal of the optical axis.

* * * * *